United States Patent
Yoshida

(10) Patent No.: US 9,945,432 B2
(45) Date of Patent: Apr. 17, 2018

(54) HYDRAULIC CONTROL DEVICE FOR DRIVE POWER DISTRIBUTION DEVICE

(71) Applicant: HONDA MOTOR CO., LTD., Tokyo (JP)

(72) Inventor: Yuma Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 15/026,265

(22) PCT Filed: Sep. 30, 2014

(86) PCT No.: PCT/JP2014/076008
§ 371 (c)(1),
(2) Date: Mar. 31, 2016

(87) PCT Pub. No.: WO2015/053129
PCT Pub. Date: Apr. 16, 2015

(65) Prior Publication Data
US 2016/0238093 A1    Aug. 18, 2016

(30) Foreign Application Priority Data
Oct. 7, 2013   (JP) ................................ 2013-210207

(51) Int. Cl.
*B60K 17/35*   (2006.01)
*F16D 48/06*   (2006.01)
(Continued)

(52) U.S. Cl.
CPC ........ *F16D 48/066* (2013.01); *B60K 23/0808* (2013.01); *B60K 17/35* (2013.01);
(Continued)

(58) Field of Classification Search
CPC ......... F16D 48/066; F16D 2500/70406; F16D 2500/507; F16D 2500/1027;
(Continued)

(56) References Cited

U.S. PATENT DOCUMENTS 5,927,425 A * 7/1999 Kusano .............. B60K 23/0808
                                                    180/248
9,611,906 B2 * 4/2017 Asano ..................... F16D 48/02
(Continued)

FOREIGN PATENT DOCUMENTS

JP    61-188232 A    8/1986
JP    02-068225 A    3/1990
(Continued)

OTHER PUBLICATIONS

International Search Report dated Jan. 13, 2015 corresponding to International Patent Application No. PCT/JP2014/076008 and English translation thereof.

(Continued)

Primary Examiner — Roger L Pang
(74) Attorney, Agent, or Firm — Squire Patton Boggs (US) LLP

(57) ABSTRACT

A drive power distribution device includes a hydraulic pressure sealing-type hydraulic pressure control device for making an operation noise of an on-off valve such as a solenoid valve less recognizable to occupants of a vehicle. By closing the on-off valve and driving the oil pump, a hydraulic pressure detected using a hydraulic pressure detection means reaches a target hydraulic pressure, and fastening power of a hydraulic clutch is maintained at an oil pressure of hydraulic fluid sealed in an oil passage until the on-off valve is opened. The drive power distribution device closes the solenoid valve when the hydraulic pressure is detected to be equal to or less than a predetermined threshold hydraulic (Continued)

pressure and equal to or less than a predetermined threshold vehicle speed. This can prevent synchronization between an accelerator operation by a driver and a closing operation of the solenoid valve.

20 Claims, 9 Drawing Sheets

(51) Int. Cl.
*B60K 23/08* (2006.01)
*F04C 2/10* (2006.01)

(52) U.S. Cl.
CPC ........ *B60K 2023/0858* (2013.01); *F04C 2/10* (2013.01); *F04C 2240/81* (2013.01); *F04C 2270/185* (2013.01); *F16D 2500/1027* (2013.01); *F16D 2500/3108* (2013.01); *F16D 2500/3109* (2013.01); *F16D 2500/507* (2013.01); *F16D 2500/70406* (2013.01); *Y10T 477/753* (2015.01)

(58) Field of Classification Search
CPC ........ F16D 2500/3108; B60K 23/0808; B60K 2023/0858; B60K 17/35; F04C 2240/81; F04C 2270/185; Y10T 477/753

USPC ........................................................ 701/67
See application file for complete search history.

(56) References Cited

U.S. PATENT DOCUMENTS

| 2006/0231310 | A1* | 10/2006 | Suzuki | ............... B60K 23/0808 180/197 |
| 2008/0234101 | A1* | 9/2008 | Suzuki | ................... F16D 48/02 477/97 |
| 2014/0020374 | A1 | 1/2014 | Sugo et al. | |

FOREIGN PATENT DOCUMENTS

| JP | 3-9169 A | 1/1991 |
| JP | 11-37268 A | 2/1999 |
| WO | WO 2012/141128 A1 | 10/2012 |

OTHER PUBLICATIONS

Notice of Reasons for Rejection (Office Action) dated Jul. 25, 2017 corresponding to Japanese Patent Application No. P2016-133525, and English translation thereof.

* cited by examiner

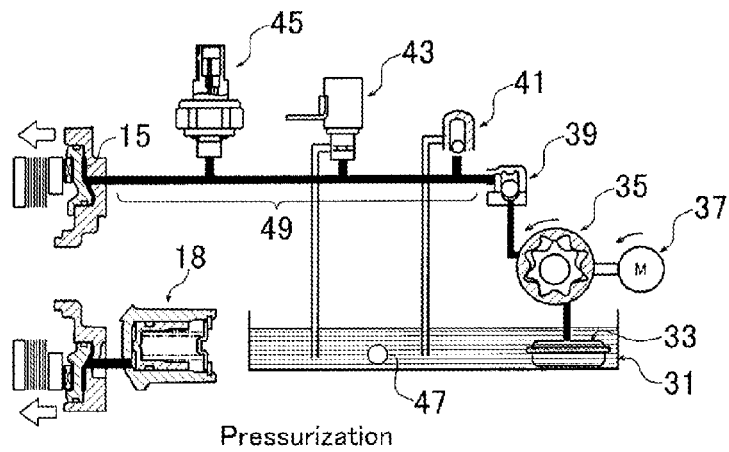
FIG.5A Pressurization
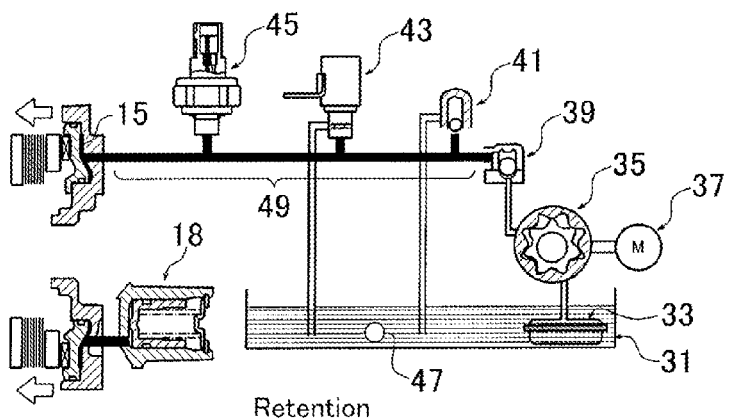
FIG.5B Retention
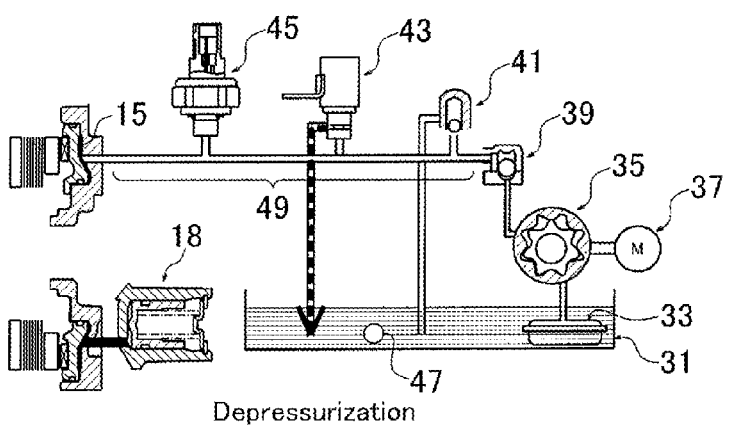
FIG.5C Depressurization

HYDRAULIC CONTROL DEVICE FOR DRIVE POWER DISTRIBUTION DEVICE

TECHNICAL FIELD

The present invention relates to a drive power distribution device including a hydraulic clutch for distributing drive power from a driving source into a main driving wheel and an auxiliary driving wheel and a hydraulic control device that controls an oil pressure for generating an engagement pressure of the hydraulic clutch.

BACKGROUND ART

Conventionally, a four-wheel-drive vehicle includes a drive power distribution device for distributing drive power generated in a driving source such as an engine to a main driving wheel and an auxiliary driving wheel. In this kind of four-wheel-drive vehicle, if a front wheel is the main driving wheel and a rear wheel is the auxiliary driving wheel, for instance, the drive power generated in the driving source is transmitted to the front wheel via a front drive shaft and a front differential, and to the drive power distribution device having a multiple disc clutch via a propeller shaft. And, a supply of hydraulic fluid at a predetermined pressure to the drive power distribution device from the hydraulic control device controls a engagement pressure of the drive power distribution device. Thus, the drive power of the driving source is transmitted to the rear wheel at a predetermined distribution ratio.

As a hydraulic control device for controlling an oil pressure supplied to the drive power distribution device, a hydraulic control device disclosed in Patent Document 1 is available conventionally. The hydraulic control device disclosed in Patent Document 1 is a hydraulic pressure sealing-type hydraulic control device using an electric oil pump and a solenoid valve (on-off valve). This hydraulic control device is configured to drive the electric oil pump and simultaneously close the solenoid valve, thereby engaging the hydraulic clutch that transmits torque between the front and rear wheels, and shifting a drive state of the vehicle from a two-wheel drive state to a four-wheel-drive state. Once the drive state has shifted to the four-wheel-drive state, the hydraulic pressure of the hydraulic clutch is maintained as long as the solenoid valve is closed. Therefore, without continuing to operate a motor for the electric oil pump, the four-wheel-drive state can continue, which is mentioned as an advantage of the hydraulic pressure sealing-type.

RELATED ART DOCUMENTS

Patent Documents

[Patent Document 1] International publication WO2012/141128

DISCLOSURE OF THE INVENTION

Problems to be Solved by the Invention

In the above-described hydraulic pressure sealing-type hydraulic control device using the electric oil pump and the solenoid valve, at a time of closing the solenoid valve, a movable metal part inside of the solenoid valve is bumped against a different metal part to generate an operation noise. This operation noise, occurring when the vehicle is stopped or running at a low speed in a traffic jam, may be recognized by a driver and a passenger of the vehicle. This may give an improper impression to the driver and the passenger such as a misunderstanding that a defect has occurred to any device of the vehicle.

In particular, in a conventional control, in order to establish the four-wheel-drive state in synchronization with acceleration of the vehicle, the solenoid valve is closed at a same timing with an accelerator control by the driver (stepping operation of an accelerator pedal). Thus, an occurrence of the operation noise in conjunction with the accelerator control by the driver might make this operation noise easily recognizable to the driver and the passenger and give an impression as if any malfunction such as a defect seems to have occurred to any device of vehicle.

The present invention was made in view of an above-mentioned point, and the purpose is to, in the drive power distribution device including the hydraulic pressure sealing-type hydraulic control device, make an operation noise of the on-off valve such as the solenoid valve less recognizable to the driver and the passenger of the vehicle.

Means of Solving the Problems

In order to solve the above-described problems, a drive power distribution device according to the present invention includes a hydraulic clutch (10), an oil pump (35), a hydraulic fluid sealing valve (39, 53), an on-off valve (43), a control means (50), an hydraulic pressure detection means (45), and a vehicle speed detection means (S1-S4). The hydraulic clutch (10) distributes drive power from a driving source (3) of a vehicle to a main driving wheel (Wf, Wf) and an auxiliary driving wheel (Wr, Wr). The oil pump (35) drives with a motor (37) for supplying hydraulic fluid to a piston chamber (15) of the hydraulic clutch (10). The hydraulic fluid sealing valve (39, 53) seals hydraulic fluid in an oil passage (49) communicating to a piston chamber (15) from the oil pump (35). The on-off valve (43) opens and closes the oil passage (49) between the hydraulic sealing valve (39, 53) and the piston chamber (15). The control means (50) controls a drive of the oil pump (35) using the motor (37) and opening and closing of the on-off valve (43) so as to supply a desired hydraulic pressure to the piston chamber (15). The hydraulic pressure detection means (45) detects a hydraulic pressure in the oil passage (49). The vehicle speed detection means (S1-S4) detects vehicle speed of the vehicle. The drive power calculation means (50) calculates drive power of the vehicle. The drive power distribution device is configured so that by closing the on-off valve (43) and driving the oil pump (35), a hydraulic pressure detected by the hydraulic pressure detection means (45) has reached a target hydraulic pressure corresponding to drive power calculated by the drive power calculation means (50), and thereafter fastening power of the hydraulic clutch (10) is maintained at an oil pressure of hydraulic fluid sealed in the oil passage (49) until the on-off valve (43) is opened. The control means (50) closes the on-off valve (43) when an oil pressure (P) detected by the hydraulic pressure detection means (45) is equal to or less than a predetermined threshold oil pressure (P1) and a vehicle speed (V) detected by the vehicle speed detection means (S8) is equal to or less than a predetermined threshold vehicle speed (V1).

According to the present invention, in the drive power distribution device that controls distribution of drive power from the driving source based on an oil pressure of hydraulic fluid sealed in the oil passage communicating to the piston chamber of the hydraulic clutch, a control of closing the on-off valve that controls discharge of hydraulic fluid supplied to the hydraulic clutch depending on an oil pressure and a vehicle speed can prevent an accelerator control of the driver and an operation of closing the on-off valve from synchronizing with each other. This can make an operation noise that occurs when the on-off valve is closed less recognizable to a passenger of the vehicle, and can prevent from giving an improper impression such as a misperception that a malfunction has occurred to any device of the vehicle to a driver and the passenger of the vehicle.

Further, according to the present invention, the on-off valve is closed when an hydraulic pressure detected by the hydraulic pressure detection means is equal to or less than a predetermined threshold hydraulic pressure, and a vehicle speed detected by the vehicle speed detection means is equal to or less than a predetermined threshold vehicle speed. This prevents the on-off valve from being closed in synchronization with an accelerator control by the driver at a time such as when the vehicle starts from a stopped state. Accordingly, an operation noise that occurs when the on-off valve is closed can be less recognizable to a passenger of the vehicle. It should be noted that in a running situation of the vehicle, for example, at a high speed, in which an operation noise generated at a time of closing the on-off valve is less recognizable to a passenger of the vehicle due to a wind nose and a road noise, no control is required in accordance with the present invention.

Further, according to the present invention, the on-off valve is closed when an hydraulic pressure detected by the hydraulic pressure detection means is equal to or less than a predetermined threshold oil pressure, and a vehicle speed detected by the vehicle speed detection means is equal to or less than a predetermined threshold vehicle speed. This enables the on-off valve to be closed before distribution of drive power using the hydraulic clutch is required (prior closing). This can improve responsiveness of drive power along with distribution of drive power using the hydraulic clutch.

In the above-described drive power distribution device, the on-off valve (43) should be a normally open-type electromagnetic valve configured so that the valve is opened without power supply. According to this configuration, since the on-off valve is the normally open-type electromagnetic valve, no operation noise occurs when the on-off valve is opened while an operation noise occurs when the on-off valve is closed.

Further, in the drive power distribution device above-described, a threshold vehicle speed (V1) should be set so that at a vehicle speed higher than the threshold vehicle speed (V1), an operation noise generated when the on-off valve (43) is closed is judged to be unrecognizable to a passenger of the vehicle due to a noise generated by driving of the vehicle.

According to this configuration, at the above-described vehicle speed higher than the threshold vehicle speed, the noise generated along with driving of the vehicle can deafen the operation noise generated when the on-off valve is closed. This can make the operation noise generated when the on-off valve is closed less recognizable to the passenger of the vehicle.

In addition, in the above-described drive power distribution device, when a target hydraulic pressure corresponding to drive power calculated by the drive power calculation means (50) is lower by a predetermined value than a target hydraulic pressure corresponding to drive power calculated last time, the control means (50) should open the on-off valve (43) to release the oil passage (49), thereby performing a control to progressively change oil pressure supplied to the hydraulic clutch (10) depending on the drive power calculated by the drive power calculation means (50). According to this configuration, responsiveness of drive power distribution using the drive power distribution device can be improved.

Further, the above-described drive power distribution device includes a lateral acceleration calculation means (S7) for calculating lateral acceleration of the vehicle. The control means (50) includes a first controlled variable output setting means (72), a second controlled variable output setting means (73), a first controlled variable output selecting means (74) and a second controlled variable output selecting means (75). Based on a lateral acceleration calculated by the lateral acceleration calculation means (S7), the first controlled variable output setting means (72) sets a first controlled variable output that contributes to reduction of one operation noise occurring from a driving system of the vehicle. Based on drive power calculated by the drive power calculation means (50) and a vehicle speed detected by the vehicle speed detection means (S1-S4), the second controlled variable output setting means (73) sets a second controlled variable output that contributes to reduction of another operation noise occurring from the driving system of the vehicle. Comparing the first controlled variable output to the second controlled variable output, the first controlled variable output selecting means (74) selects a larger one of the controlled variable outputs. Comparing the controlled variable output selected by the first controlled variable output selecting means (74) to a basic controlled variable output set on the basis of the controlled variable output calculated by the drive power calculation means (50), the second controlled variable output selecting means (75) selects a smaller one of the controlled variable outputs. Based on the controlled variable outputs selected by the first controlled variable output selecting means (74) and by the second controlled variable output selecting means (75), the control means (50) should perform a hydraulic control of the hydraulic clutch (10).

While maintaining driving performance of the vehicle, such configuration can effectively control an operation noise that occurs from the driving system of the vehicle except the operation noise generated when the on-off valve is closed. Therefore, this can make an abnormal noise that occurs from the driving system of the vehicle less recognizable to the passenger of the vehicle, and can prevent giving such an improper impression to the driver and the passenger of the vehicle as a misperception that a malfunction has occurred to any device of the vehicle.

In this case, when the vehicle is judged to be turning, the control means (50) should perform no hydraulic control of the hydraulic clutch (10) on the basis of the controlled variable outputs selected by the first controlled variable output selecting means (74) and the second controlled variable output selecting means (75).

When the vehicle is judged to be turning, the control means (50) performs no hydraulic control of the hydraulic clutch (10) on the basis of the controlled variable outputs selected by the first controlled variable output selecting means (74) and the second controlled variable output selecting means (75), thereby enabling to suppress a change in drive power when the vehicle is turning. On the other hand, during turning of the vehicle, a noise such as a road noise along with driving of the vehicle is relatively large. Due to this, even if suspending a hydraulic control of the hydraulic clutch (10) on the basis of controlled variable outputs selected by the first controlled variable output selecting means (74) and the second controlled variable output selecting means (75), the passenger is less concerned about a strange noise occurring from the driving system of the vehicle.

It should be noted that the bracketed reference numerals are examples of the elements of the embodiment described later.

Effects of the Invention

In a simple configuration and control, the drive power distribution device in accordance with the present invention can make an operation noise of the on-off valve less recognizable to the driver and the passenger of the vehicle, and can prevent giving such an improper impression to the driver and the passenger of the vehicle as if a malfunction has occurred to any device of the vehicle.

BRIEF DESCRIPTION OF THE DRAWINGS

FIGS. 3(a) and 3(b) are flow charts illustrating processes of a hydraulic control of a piston chamber, of which FIG. 3(a) is the flow chart illustrating the process at a time of pressurization, and FIG. (b) is the flow chart illustrating the process at a time of decompression;

FIGS. 5(a), 5(b) and 5(c) are schematic diagrams illustrating states of hydraulic fluid in a hydraulic circuit in a hydraulic pressure control of a piston chamber, of which FIG. 5(a) is the diagram showing the state of the hydraulic fluid at a time of pressurization, FIG. 5(b) is the diagram showing the state of the hydraulic fluid at a time of holding hydraulic pressure, and FIG. 5(c) is the diagram showing the state of hydraulic fluid at a time of decompression;

MODE FOR CARRYING OUT THE INVENTION

Figure 1:
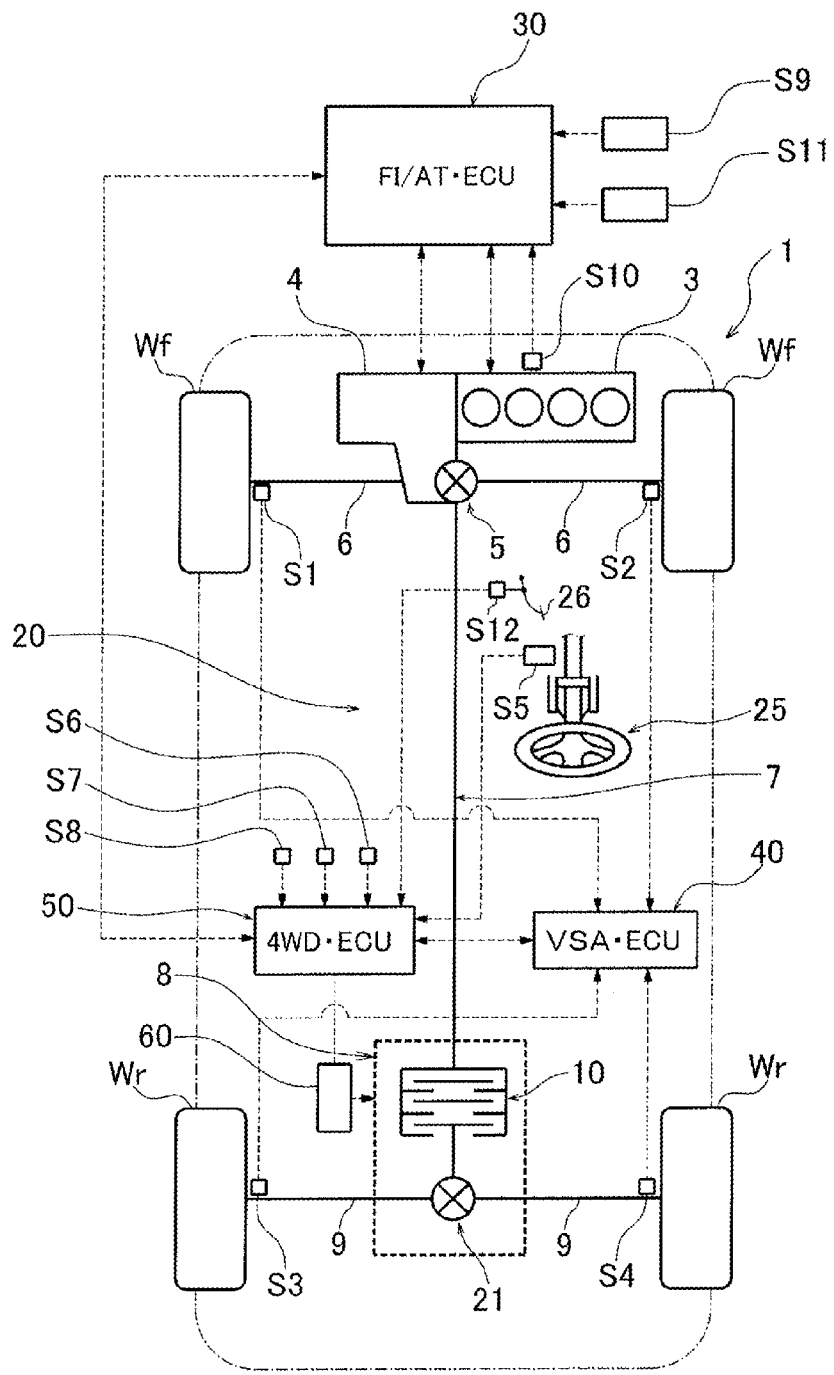
FIG. 1 is a schematic view illustrating a configuration of a four-wheel-drive vehicle including a hydraulic control device of a drive power distribution device in accordance with the embodiment of the present invention.

Hereinafter, an embodiment of the present invention will be described in detail with reference to the appending drawings. FIG. 1 is a schematic view illustrating a configuration of a four-wheel-drive vehicle including the hydraulic control unit of the drive power distribution device in accordance with the embodiment of the present invention. The four-wheel-drive vehicle 1 shown in the same figure includes an engine (driving source) 3, an automatic transmission 4 and a drive power transmission route 20. The engine (driving source) 3 is transversely mounted on the front part of the vehicle. The automatic transmission 4 is disposed integrally with the engine 3. The drive power transmission route 20 transmits drive power from the engine 3 to front wheels Wf, Wf and rear wheels Wr, Wr. The automatic transmission 4 is a continuously variable transmission (CVT) configured to be wound between a drive pulley and a driven pulley, of which detailed illustration is omitted.

An output shaft (not shown in the figure) of the engine 3 is coupled to the right and left front wheels Wf, Wf, which are main driving wheels, via the automatic transmission 4, a transfer (TRF) (not shown in the figure), a front differential 5 and right and left front drive shafts 6, 6. Furthermore, the output shaft of the engine 3 is coupled to the right and left rear wheels Wr, Wr, which are auxiliary driving wheels, via the automatic transmission 4, the transfer, the front differential 5, a propeller shaft 7, a rear differential unit (hereinafter referred to as "rear diff unit") 8 and right and left rear drive shafts 9, 9.

The rear diff unit 8 includes a rear differential 21, a front and rear torque distribution clutch 10 and a hydraulic circuit 60. The rear diff 21 distributes drive power to the left and right rear drive shafts 9, 9. The front and rear torque distribution clutch 10 connects and disconnects the drive power transmission route from the propeller shaft 7 to the rear differential 21. The hydraulic circuit 60 supplies hydraulic fluid to the front and rear torque distribution clutch 10. The front and rear torque distribution clutch 10 is a hydraulic clutch and is a drive power distribution device for controlling distribution of drive power to the rear wheels Wr, Wr in the drive power transmission route 20. A 4WD/ECU 50 controls a hydraulic pressure supplied from the hydraulic circuit 60, thereby controlling drive power distributed to the rear wheels Wr, Wr using the clutch 10. Thus, in performing a drive control, the front wheels Wf, Wf are the main driving wheels and the rear wheels Wr, Wr are the auxiliary driving wheels.

In other words, when the front and rear torque distribution clutch 10 is released (or disengaged), no rotation of the propeller shaft 7 is transmitted to a rear differential 21 side, and all torque of the engine 3 is transmitted to the front wheels Wf, Wf, resulting in a front-wheel drive (2WD) state. On the other hand, when the front and rear torque distribution clutch 10 is engaged, a rotation of the propeller shaft 7 is transmitted to the rear differential 21 side, and the torque of the engine 3 is distributed to both the front wheels Wf, Wf and the rear wheels Wr, Wr, resulting in a four-wheel-drive (4WD) state.

The four-wheel-drive vehicle 1 is equipped with an FI/AT/ECU 30, a VSA/ECU 40, and the 4WD/ECU 50 that are control means for controlling driving of the vehicle. Moreover, the four-wheel-drive vehicle 1 is equipped with: a left front wheel speed sensor S1, a right front wheel speed sensor S2, a left rear wheel speed sensor S3 and a right rear wheel speed sensor S4. The left front wheel speed sensor S1 detects a wheel speed of the left front wheel Wf on the basis of a rotation speed of the left front drive shaft 6. The right front wheel speed sensor S2 detects a wheel speed of the right front wheel W2 on the basis of a rotation speed of the right front drive shaft 6. The left rear wheel speed sensor S3 detects a wheel speed of the left rear wheel Wr on the basis of a rotation speed of the left rear drive shaft 9. The right rear wheel speed sensor S4 detects a wheel speed of the right rear wheel Wr on the basis of a rotation speed of the right rear drive shaft 9. Thus, these four wheel speed sensors S1-S4 detect wheel speeds VW1-VW4 of the four wheels respectively. Detected signals of the wheel speeds VW1-VW4 are sent to the VSA/ECU 40.

In addition, the four-wheel-drive vehicle 1 is equipped with a steering angle sensor S5, a yaw rate sensor S6, a lateral acceleration sensor S7, a vehicle speed sensor S8, an accelerator opening sensor S12 and other devices. The steering angle sensor S5 detects an steering angle of a steering wheel 25. The yaw rate sensor S6 detects a yaw rate of a vehicle body. The lateral acceleration sensor S7 detects a lateral acceleration of the vehicle body. The vehicle speed sensor S8 detects a vehicle body speed of the vehicle (vehicle speed). The accelerator opening sensor S12 detects an opening of the accelerator pedal 26. Signals detected from the steering angle sensor S5, the yaw rate sensor S6, the lateral acceleration sensor S7 and the vehicle speed sensor S8 are sent to the 4WD/ECU 50.

The FI/AT/ECU 30 is a control means for controlling the engine 3 and the automatic transmission 4, and is configured including a microcomputer made of a RAM, a ROM, a CPU and an I/O interface (none of which is shown in the figure). A signal of a throttle opening (accelerator opening) Th detected by a throttle opening sensor (accelerator opening sensor) S9, a signal of an engine rotational speed Ne detected by an engine rotational speed sensor S10, and a signal of a shift position detected by a shift position sensor S11 are sent to the FI/AT/ECU 30. Further, an engine torque map that describes relationship between an engine rotational speed Ne, a throttle opening Th, an intake air amount and a engine torque estimation value Te is stored in the FI/AT/ECU 30, whereby the engine torque estimation value Te is calculated based on the intake air amount detected by an air flow meter and the engine rotational speed Ne detected by the engine rotational speed sensor S10.

The VSA/ECU 40 is a control means including a function of ABS (Antilock Braking System), a function of TCS (Traction Control System) and a function of sideway skid suppression system at time of turning. The function of ABS (Antilock Braking System) prevents wheel lock at a time of braking by performing an anti-lock control of the left, right, front and rear wheels Wf, Wf and Wr, Wr. The function of TCS (Traction Control System) prevents idle running of the wheels at a time of acceleration of the vehicle. The function of sideway skid suppression system works at a time of turning. The VSA/ECU 40 controls these three functions to perform a vehicle behavior stability control. Similar to the above-described FI/AT/ECU 30, the VSA/ECU 40 is composed of a microcomputer.

Figure 2:
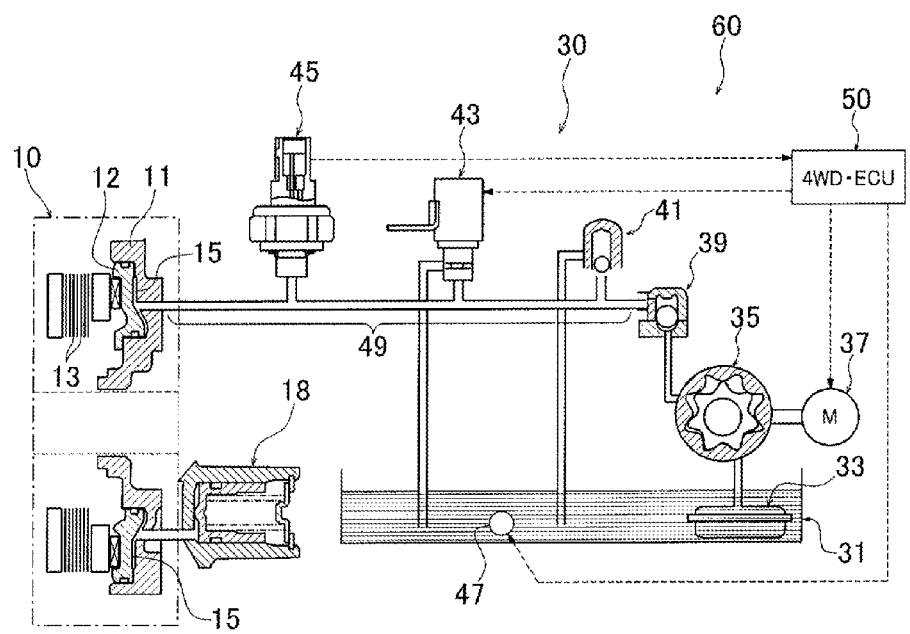
FIG. 2 is a view illustrating a hydraulic circuit of a hydraulic control device.

Similar to FI/AT/ECU 30 and VSA/ECU 40, the 4WD/ECU 50 is composed of a microcomputer. The 4WD/ECU 50, the FI/AT/ECU 30 and the VSA/ECU 40 are connected to each other. Therefore, the signals detected from the above-mentioned wheel speed sensors S1-S4 and the shift position sensor S11, and information of the engine torque estimation value Te are input to the 4WD/ECU 50 via serial communication between the FI/AT/ECU 30 and the VSA/ECU 40. Depending on such input information, as well as on the basis of a control program stored in the ROM, each of flag values and calculated values stored in the RAM, the 4WD/ECU 50 calculates drive power distributed to the rear wheels Wr, Wr (hereinafter referred to as "four-wheel driving torque") and a corresponding hydraulic pressure supply to the front and rear torque distribution clutch 10, as will be described later, and outputs a controlled variable output based on the calculation result to the front and rear torque distribution clutch 10. FIG. 2 is a figure illustrating a detailed configuration of the hydraulic circuit 60. The hydraulic circuit 60 shown in the same figure includes an oil pump 35, a motor (electric motor) 37 and an oil passage 49. The oil pump 35 pumps up and forcibly feeds hydraulic fluid accumulated in an oil tank 31 via a strainer 33. The motor (electric motor) 37 drives the oil pump 35. The oil passage 49 communicates to the piston chamber 15 of the front and rear torque distribution clutch (hereinafter, simply referred to as "clutch") 10 from the oil pump 35.

The clutch 10 includes a cylinder housing 11 and a piston 12. The piston 12 advances and retreats in the cylinder housing 11, thereby pressing a plurality of laminated friction materials 13. In the cylinder housing 11, the piston chamber 15 is defined so that hydraulic fluid is introduced between the piston chamber 15 and the piston 12. The piston 12 is arranged opposite to one end in a laminated direction of the plurality of friction materials 13. Thus, the piston 12 presses the frictional materials 13 in the laminated direction at a hydraulic pressure of the hydraulic fluid supplied to the piston chamber 15. This allows the clutch 10 to engage at a predetermined engagement pressure.

In the oil passage 49 communicating to the piston chamber 15 from the oil pump 35, a one way valve (unidirectional valve) 39, a relief valve 41, a solenoid valve (on-off valve) 43 and a hydraulic pressure sensor 45 are installed in this order. The one way valve 39 is configured to circulate hydraulic fluid toward a piston chamber 15 side from an oil pump 35 side, but to prevent the hydraulic fluid from circulating in the reverse direction. This can seal the hydraulic fluid pumped to a downstream side of the one way valve 39 by driving of the oil pump 35 into the oil passage 49 between the one way valve 39 and the piston chamber 15. Hereinafter, the oil passage may be referred to as "sealed oil passage." The oil passage 49 between the above-described one way valve 39 and the above-described piston chamber 15 constitutes a hydraulic pressure holding part for holding a hydraulic pressure supplied to the clutch 10.

The relief valve 41 is configured to open when a pressure of the oil passage 49 between the one way valve 39 and the piston chamber 15 abnormally exceeds a predetermined threshold value, thereby releasing a hydraulic pressure of the oil passage 49. Hydraulic fluid drained from the relief valve 41 returns to the oil tank 31. The solenoid valve 43 is an on-off type valve that is PWM-controlled (duty-controlled) on the basis of a command from the 4WD/ECU 50, enabling to control opening and closing of the oil passage 49. Consequently, the solenoid valve can control hydraulic pressure of the piston chamber 15. The solenoid valve 43 is the normally open-type electromagnetic valve. Therefore, at a time of closing the solenoid valve, a movable metal part inside of the solenoid valve is bumped against another metal part to generate an operation noise (metal contact noise). On the other hand, no operation noise occurs when the on-off valve is opened. It should be noted that the hydraulic fluid drained from the oil passage 49 due to opening of the solenoid valve 43 returns to the oil tank 31. The hydraulic pressure sensor 45 is a hydraulic pressure detection means for detecting hydraulic pressure of the oil passage 49 and the piston chamber 15. Values detected from the hydraulic pressure sensor 45 are sent to the 4WD/ECU 50. Further, the piston chamber 15 communicates to an accumulator 18. The accumulator 18 has an effect of suppressing a sudden change in hydraulic pressure and a hydraulic pulsation in the piston chamber 15 and the oil passage 49. In the oil tank 31, a hydraulic fluid temperature sensor 47 is installed for detecting a temperature of hydraulic fluid. A value detected from the hydraulic fluid temperature sensor 47 is sent to the 4WD/ECU 50.

Figures 3A, 3B:
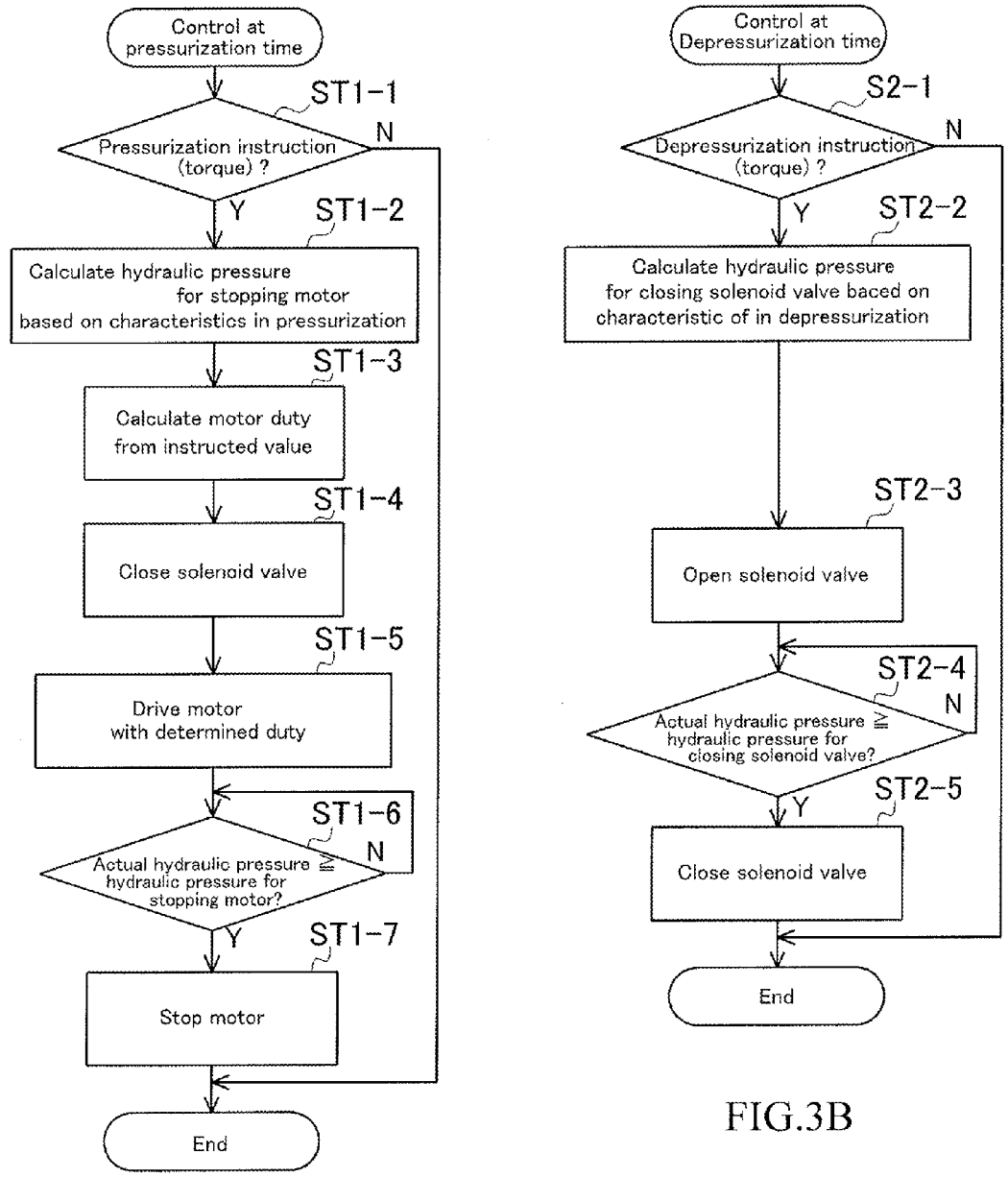
Figure 4:
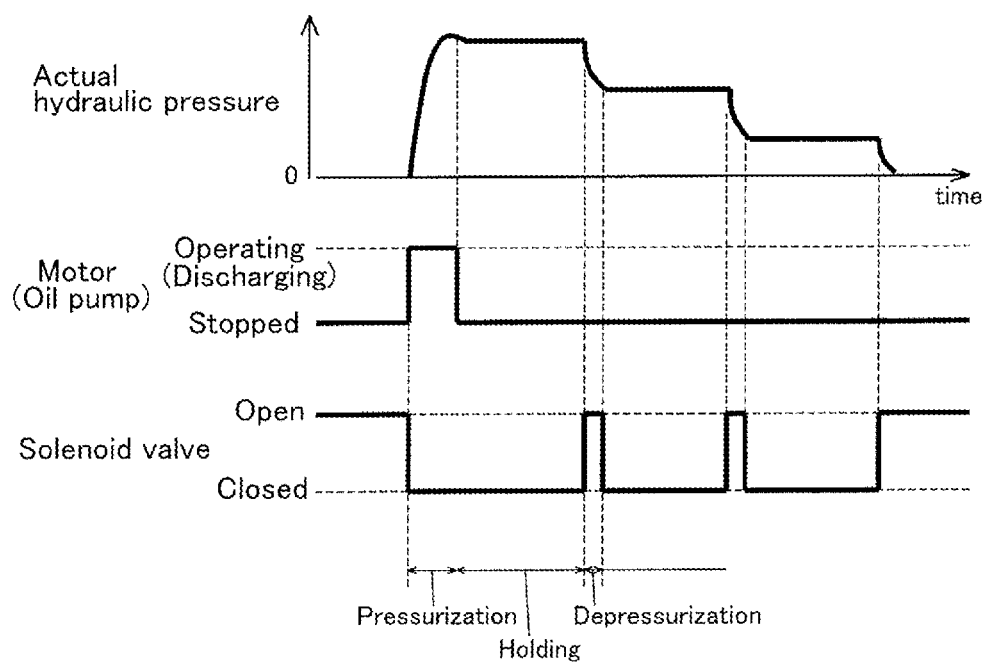
FIG. 4 is a timing chart illustrating an operation and stopping of a motor (oil pump) and an opening and closing of a solenoid valve in a hydraulic pressure control of a piston chamber, and changes in actual hydraulic pressure.

FIGS. 3(a) and 3(b) are flow charts illustrating processes of hydraulic controls of the piston chamber, of which FIG. 3(a) is the flow chart illustrating the process at a time of pressurization, and FIG. (b) is the flow chart illustrating the process at a time of decompression. And, FIG. 4 is a timing chart illustrating an operation and stopping of the motor (oil pump 35) and an opening and closing of the solenoid valve 43 in a hydraulic pressure control of the piston chamber 15 and changes in actual hydraulic pressure. FIGS. 6(a), 6(b) and 6(c) are schematic diagrams illustrating states of hydraulic fluid in the hydraulic circuit 60 in a hydraulic pressure control of the piston chamber 15, of which FIG. 6(a) is the diagram showing the state of hydraulic fluid at a time of pressurization, FIG. 6(b) is the diagram showing the state of hydraulic fluid at a time of holding hydraulic pressure, and FIG. 6(c) is the diagram showing the state of hydraulic fluid at a time of decompression.

In pressurizing the piston chamber 15, the drive power distribution device of the present embodiment performs a hydraulic control in such a way as to control (duty-control) driving of the motor 37 (oil pump 35), thereby controlling the piston chamber 15 so as to reach a target hydraulic pressure on the basis of hydraulic pressure-torque characteristics in pressurization. After pressurizing the piston chamber 15 until reaching the target hydraulic pressure, the hydraulic control device 60 seals hydraulic fluid into the sealed oil passage 49 until starting decompression. This can keep torque of the clutch 10 substantially constant. In decompressing the piston chamber 15, on the other hand, the hydraulic control device 60 prohibits an operation of the oil pump 35 and controls (on-off-controls) opening and closing of the solenoid valve 43, thereby controlling the piston chamber 15 so as to reach the target hydraulic pressure on the basis of hydraulic pressure-torque characteristics in decompression. It should be noted that the above-described hydraulic pressure-torque characteristics in pressurization and decompression 15 are previously modeled as hydraulic pressure values in the sealed oil passage 49 corresponding to drive power (rear torque) to be distributed to the rear wheels Wr, Wr.

According to the flow chart of FIG. 3, the procedures of hydraulic pressure controls at the time of pressurization and decompression of the piston chamber 15 will be described below. In the control flow at the time of pressurization as shown in FIG. 4(a), the 4WD/ECU 50 first determines whether a pressurization instruction (pressurization instruction torque) for the piston chamber 15 is given (Step ST1-1). Having determined drive power distributed to the front wheels Wf, Wf and the rear wheels Wr, Wr according to a running condition of the vehicle, the 4WD/ECU 50 determines whether the pressurization instruction for the piston chamber 15 is given, according to whether fastening of the clutch (drive power distribution device) 10 or an increase in fastening power is required. As a result, on one hand, without the pressurization instruction to the piston chamber 15 (NO), the 4WD/ECU 50 terminates the process. On the other hand, with the pressurization instruction to the piston chamber 15 (YES), the 4WD/ECU 50 subsequently calculates a hydraulic pressure (instructed hydraulic pressure) for stopping the oil pump 35 (motor 37) on the basis of the hydraulic pressure-torque characteristics of the pressurized piston chamber 15 (Step ST1-2). Then, the 4WD/ECU 50 determines a duty ratio of PWM control for driving the motor 37 from the instructed hydraulic pressure that has been calculated (Step ST1-3). Afterwards, if the solenoid valve 43 is open, the 4WD/ECU 50 closes the solenoid valve 43 to seal the oil passage 49 (Step ST1-4), and in turn drives the motor 37 at the determined duty ratio to operate the oil pump 35 (Step ST1-5). Consequently, hydraulic fluid is fed to the oil passage 49 between the one way valve 39 and the piston chamber 15, whereby hydraulic pressure of the oil passage 49 and the piston chamber 15 rises. Afterwards, the 4WD/ECU 50 determines whether the hydraulic pressures (actual hydraulic pressures) of the oil passage 49 and the piston chamber 15 detected by the hydraulic pressure sensor 45 have reached equal to or more than the hydraulic pressure (instructed hydraulic pressure) for stopping the oil pump 35 (motor 37) (Step ST1-6). If the hydraulic pressures of the oil passage 49 and the piston chamber 15 have reached the hydraulic pressure for stopping the oil pump 35 (YES), the 4WD/ECU 50 stops the operation of the motor 37 (oil pump 35) (Step ST1-7) to terminate the control at the time of pressurization. It should be noted that at this time of the pressurization of the piston chamber 15, until the hydraulic pressures of the oil passage 49 and the piston chamber 15 reach the target hydraulic pressure, the 4WD/ECU 50 should control to drive the motor 37 so that the oil pump 35 discharges hydraulic fluid at a constant pressure.

On the other hand, in the control flow at the time of decompression shown in FIG. 3(b), the 4WD/ECU 50 determines a decompression instruction (decompression instruction torque) for the piston chamber 15 is given (Step ST2-1). Having determined drive power distributed to the front wheels Wf, Wf and the rear wheels Wr, Wr according to a running condition of the vehicle, the 4WD/ECU 50 determines whether the decompression instruction for the piston chamber 15 is given according to whether fastening release of the clutch (drive power distribution device) 10 or a decrease in fastening power is required. As a result, without the decompression instruction for the piston chamber 15 (NO), the 4WD/ECU 50 terminates the process. On the other hand, with the decompression instruction for the piston chamber 15, the 4WD/ECU 50 subsequently calculates a hydraulic pressure (instructed hydraulic pressure) for closing the solenoid valve 43 on the basis of hydraulic pressure-torque characteristics of the pressurized piston chamber 15 (Step ST2-2). Afterwards, the 4WD/ECU 50 opens the solenoid valve 43 to release the sealed oil passage 49 (Step ST2-3) and in turn controls hydraulic pressures of the oil passage 49 and the piston chamber 15. Consequently, hydraulic fluid in the oil passage 49 is discharged via the solenoid valve 43, whereby the hydraulic pressures decrease. Afterwards, the 4WD/ECU 50 determines whether the hydraulic pressures (actual hydraulic pressures) of the oil passage 49 and the piston chamber 15 detected by the hydraulic pressure sensor 45 have become equal to or less than the hydraulic pressure (instructed hydraulic pressure) for closing the solenoid valve 43 (Step ST2-4). If the hydraulic pressures of the oil passage 49 and the piston chamber 15 have reached the hydraulic pressure for closing the solenoid valve 43 (YES), the 4WD/ECU 50 closes the solenoid valve 43 (Step ST2-5) to terminate the control at the time of decompression.

In the timing chart of FIG. 4, at the time of the pressurization from a time T1 to a time T2, the 4WD/ECU 50 performs the hydraulic pressure control at the time of pressurization according to the flow chart of FIG. 3(a). In this hydraulic pressure control at the time of pressurization, as described above, the 4WD/ECU 50 controls to drive the oil pump 35 according to the instructed hydraulic pressure, thereby controlling the hydraulic pressure of the piston chamber 15 so as to reach the target hydraulic pressure corresponding to desired torque. In other words, the 4WD/ECU 50 measures a hydraulic pressure of hydraulic fluid in the sealed oil passage 49 using the hydraulic pressure sensor 45, and in turn continues to operate the motor 37 and keeps the solenoid valve 43 closed until this hydraulic pressure reaches a value (target hydraulic pressure) at which torque to be distributed to the rear wheels Wr, Wr can be output. FIG. 5(a) illustrates the state of the hydraulic fluid in the hydraulic circuit 60 at this time of pressurization.

Afterwards, the 4WD/ECU 50 stops the operation of the motor 37 (oil pump 35) at the time T2. FIG. 5(b) illustrates the state of the hydraulic fluid in the hydraulic circuit 60 while holding the hydraulic pressure from the time T2 to a time T3. In this state, the hydraulic fluid at the instructed hydraulic pressure is sealed in the oil passage 49. Therefore, even if the oil pump 35 stops to operate, torque (actual torque) of the clutch 10 is maintained substantially constant for a while. Thus, the target state of four-wheel drive (4WD) continues for a required time. It should be noted that if a higher target hydraulic pressure is set in this state, the 4WD/ECU 50 further operates the motor 37 to pressurize the oil passage 49, although not shown in the figure.

From the time T3, the 4WD/ECU 50 performs the hydraulic pressure control at the time of decompression according to the flow chart of FIG. 3(b). In this hydraulic pressure control at the time of pressurization, as described above, the 4WD/ECU 50 controls the opening and closing of the solenoid valve 43 in accordance with the instructed hydraulic pressure, whereby the hydraulic pressure of the piston chamber 15 is controlled so as to fall to the target hydraulic pressure corresponding to the desired torque. FIG. 5(c) illustrates the state of the hydraulic fluid in the hydraulic circuit 60 at the time of decompression. Further, in this state, the 4WD/ECU 50 keeps the solenoid valve 43 open until the sealed oil passage 49 reaches a lower target hydraulic pressure (but higher than a pressure at a time of starting pressurization), or, in detail, a target hydraulic pressure set (calculated) this time being lower than the target hydraulic pressure set last time by a predetermined value, and closes the solenoid valve 43 at such target hydraulic pressure set this time. Consequently, the instructed hydraulic pressures of the oil passage 49 and the piston chamber 15 and the instructed torque of the clutch 10 are controlled so as to progressively change over a plurality of gear positions. A lowered hydraulic pressure of the piston chamber 15 reduces pressing force of the friction materials 13 and in turn torque distributed to the rear wheels Wr, Wr. Finally, the hydraulic pressure in the sealed oil passage 49 is lowered to the hydraulic pressure at the time of starting pressurization, thereby establishing a two-wheel drive (2WD) state, in which drive power is distributed only to the front wheels Wf, Wf.

In this way, the 4WD/ECU 50 controls hydraulic pressure supplied from the hydraulic circuit 60, thereby controlling drive power distributed to the rear wheels Wr, Wr using the clutch 10. Thus, in performing a drive control, the front wheels Wf, Wf are the main driving wheels and the rear wheels Wr, Wr are the auxiliary driving wheels. In other words, while the clutch 10 is released (disengaged), a rotation of the propeller shaft 7 fails to be transmitted to the rear differential 21 side. Instead, whole torque of the engine 3 is transmitted to the front wheels Wf, Wf, establishing the front-wheel drive (2WD) state. On the other hand, while the clutch 10 is engaged, the rotation of the propeller shaft 7 is transmitted to the rear differential 21 side. Consequently, the torque of the engine 3 is distributed to both the front wheels Wf, Wf and the rear wheels Wr, Wr, establishing the four-wheel drive (4WD) state. On the basis of results detected from various detection means (not shown tin the figure) for detecting a running condition of the vehicle, the 4WD/ECU 50 calculates drive power distributed to the rear wheels Wr, Wr and a corresponding hydraulic pressure supplied to the clutch 10, and in turn outputs a driving signal to the clutch 10 on the basis of these calculation results. This allows to control fastening force of the clutch 10 and thus control the drive power distributed to the rear wheels Wr, Wr.

Further, as a control of closing the solenoid valve 43, the drive power distribution device of this embodiment performs a control of closing the solenoid valve 43 when an oil pressure of the oil passage 49 or the piston chamber 15 detected by the oil pressure sensor 45 is equal to or less than a predetermined value (threshold hydraulic pressure P1 to be described below) and a vehicle speed based on a wheel rotation rate detected by the wheel speed sensor S1-S4 is equal to or less than a predetermined value (threshold vehicle speed V1 to be described below). This control will be described in detail below.

Figure 6:
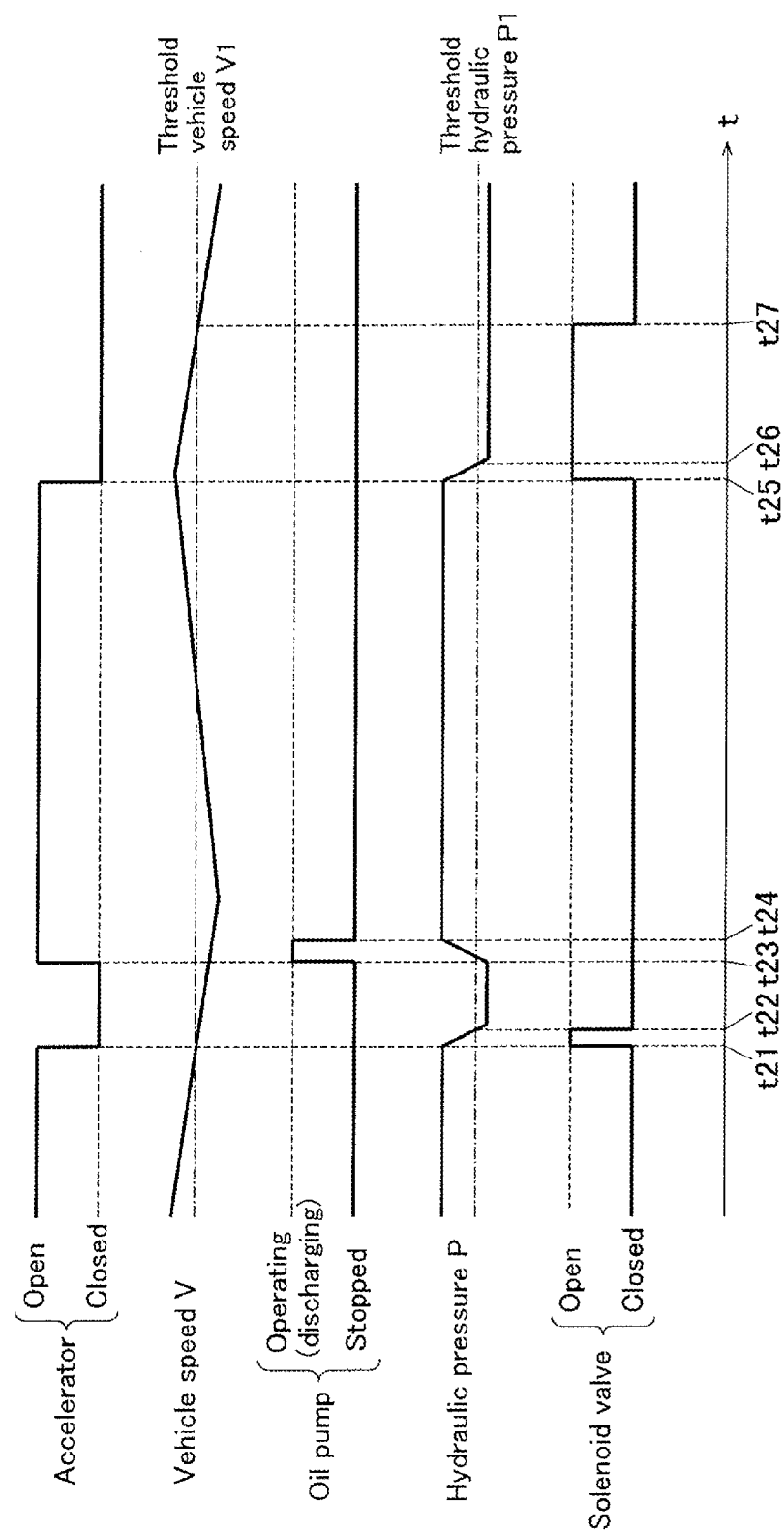
FIG. 6 is a timing chart illustrating changes in each value in a control of closing the solenoid valve.

FIG. 6 is a timing chart illustrating temporal change in value related to the accelerator AP, the oil pump 35 and the solenoid valve 43 in the control of closing the solenoid valve. In the control of closing the solenoid valve 43, the accelerator AP shifts from an open state to a closed state at time t21, and simultaneously the solenoid valve 43 shifts from the closed sate to the open state. This causes hydraulic pressure P of the oil passage 49 to decrease, and in turn the solenoid valve 43 to shift from the open state to the closed state. In this way, in the control of closing the solenoid valve 43, the solenoid valve 43 is closed on the condition that a vehicle speed V is equal to or less than a threshold V1 and the hydraulic pressure P of the oil passage 49 is equal to or less than a threshold P1. Therefore, no synchronization is realized between a timing when the accelerator AP shifts from the closed state to the open state and a timing when the solenoid valve 43 shifts from the open state to the closed state. Both timings are different from each other. Afterwards, the oil pump 35 starts to operate at time t23, whereby the hydraulic pressure P rises. The oil pump 35 stops operating at time t24, whereby the hydraulic pressure of the oil passage 49 is subsequently maintained. Afterwards, the accelerator AP shifts from the open state to the closed state at time t25, and the solenoid valve 43 shifts from the closed state to the open state. This causes the hydraulic pressure P of the oil passage 49 to decrease. And, the hydraulic pressure P of the oil passage 49 is again equal to or less than the threshold P1 at time t26, and the vehicle speed V is equal to or less than the threshold V1 at time t27, whereby the solenoid valve 43 shifts from the open state to the closed state.

The threshold vehicle speed V1 in the above-described control is a threshold to be set from the viewpoint of a noise such as a road noise along with driving of the vehicle. In other words, at a vehicle speed V equal to or more than this threshold vehicle speed V1, an operation noise generated when the solenoid valve 43 is closed is judged to be unrecognizable to a passenger of the vehicle due to a noise such as a road noise generated by the running of the vehicle. This threshold vehicle speed V1 can be set, for instance, at a vehicle speed of substantially zero. And, the threshold hydraulic pressure P1 can be determined from a viewpoint for preventing an unexpected transmission of drive power to the rear wheels Wr, Wr by force of fastening of the clutch 10 due to closing the solenoid valve 43.

In this way, in the drive power distribution device of this embodiment, the solenoid valve 43 is controlled to be closed when the oil pressure P detected by the hydraulic pressure sensor 45 is equal to or less than the threshold oil pressure P1 and the vehicle speed V based on a wheel rotation rate detected by the wheel speed sensor S1-S4 is equal to or less than the threshold vehicle speed V1. This can prevent synchronization between an accelerator control (stepping operation of the accelerator pedal) by a driver and an operation of closing the solenoid valve 43, enabling to make an operation noise generated when the solenoid valve 43 is closed less recognizable to the passenger of the vehicle.

Figure 7:
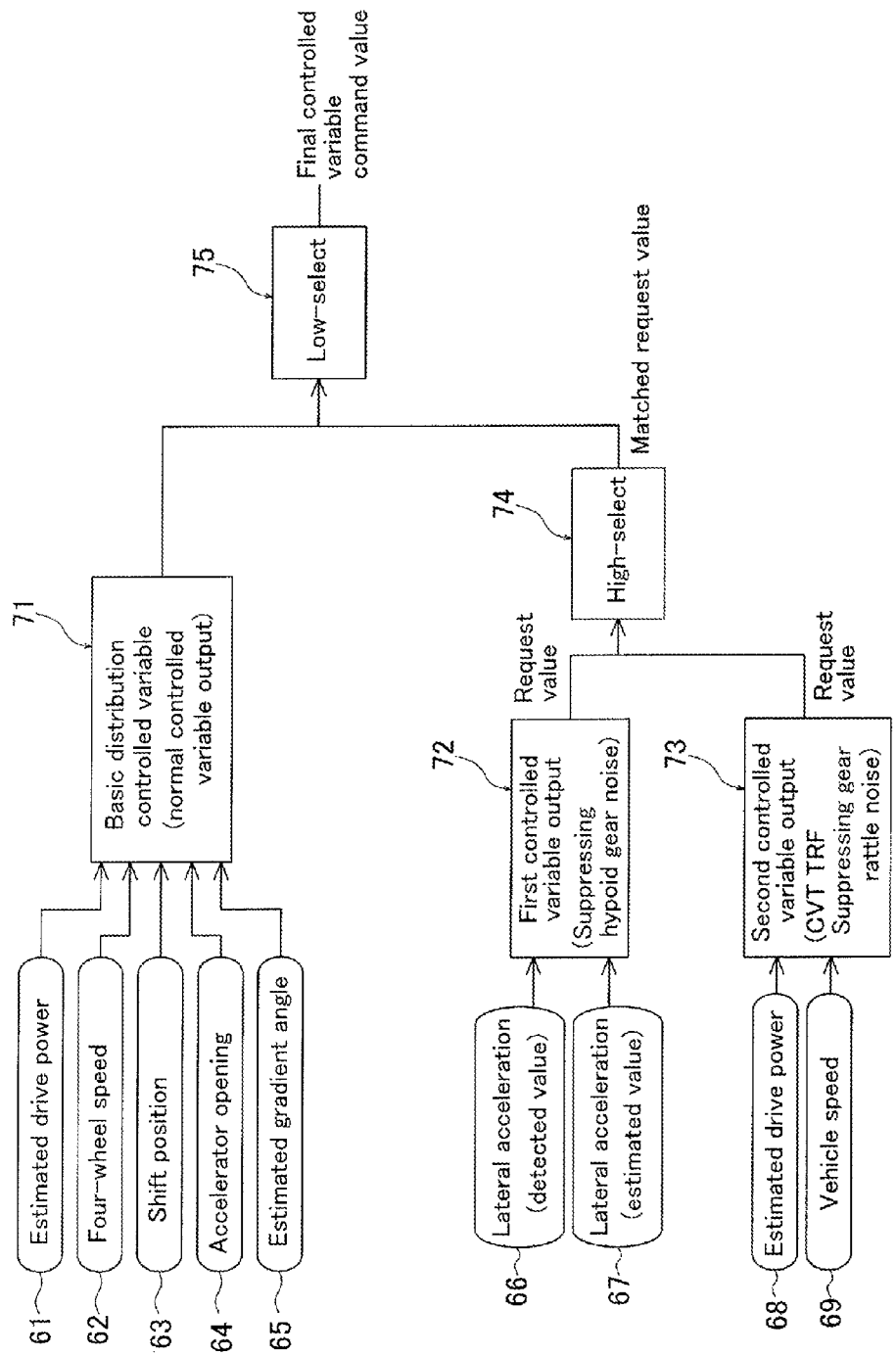
FIG. 7 is a block diagram describing a calculation process of controlled variable output to the hydraulic clutch.
Figure 8:
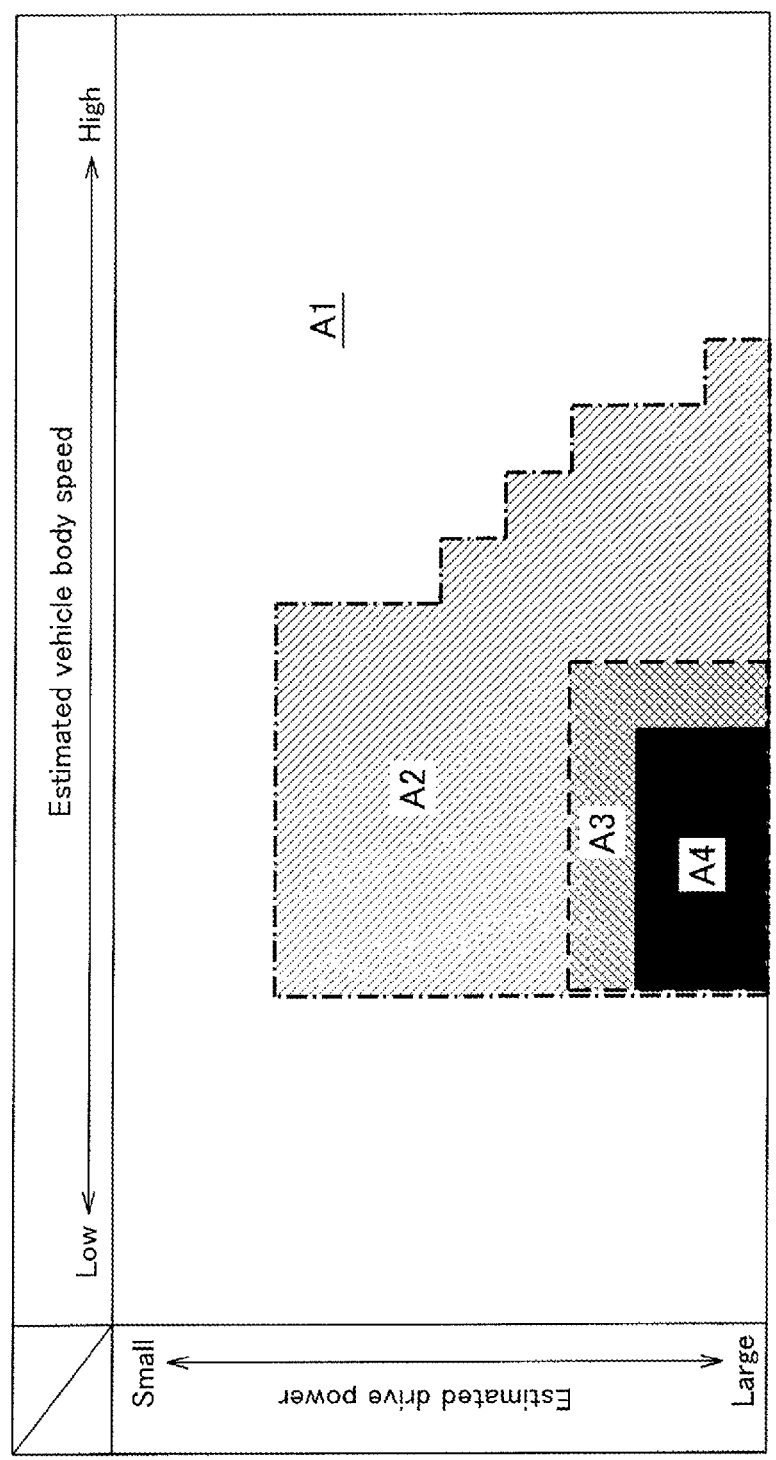
FIG. 8 is a map illustrating distribution of drive power based on calculated controlled variable outputs of the hydraulic clutch.

Next, a calculation process of a controlled variable output for controlling the hydraulic clutch 10 using the 4WD/ECU 50 will be described. FIG. 7 is a block diagram describing the calculation process of the controlled variable output. And, FIG. 8 is a map illustrating distribution of drive power based on the calculated controlled variable output of the hydraulic clutch. On the map of FIG. 8, the horizontal axis stands for estimated vehicle body speed, and the vertical axis stands for estimated drive power. An estimated vehicle body speed is calculated (estimated) based on four-wheeled wheel speeds detected by the wheel speed sensors S1-S4. As shown in FIG. 7, in calculation of a controlled variable output of the hydraulic clutch 10, first, a basic distribution of controlled variable output corresponding to drive power distributed to the rear wheels Wr, Wr is calculated by a basic distribution calculation block 71. This basic distribution of controlled variable output is calculated on the basis of an estimated drive power 61 of the vehicle calculated beforehand and wheel speeds 62 of the front, rear, left and right wheels (four-wheel speeds) detected by the wheel speed sensors S1-S4. This basic distribution of controlled variable output may be also calculated on the basis of a shift position 63, an accelerator opening 64, an estimated gradient angle 65 and other values in addition to these estimated drive power 61 and wheel speeds 62. This basic distribution of controlled variable output can be set larger as estimated drive power of the vehicle becomes larger, and set to progressively increase depending on the estimated drive power of the vehicle. It should be noted that estimated drive power (estimated driving torque) 61 of the vehicle is calculated on the basis of an engine torque estimation value Te calculated by the above-described FI/AT/ECU 30 and a gear ratio fixed by a shift position of the transmission. A range of drive power control at this basic distribution of controlled variable output calculated by the basic distribution calculation block 71 corresponds to an area A1 on the map of FIG. 8.

On the other hand, in calculation of the controlled variable output of this embodiment, a request value of controlled variable output for suppressing a strange noise (gear rattle noise) generated in a hypoid gear (not shown in the figure) provided by the rear differential 21 (hereinafter referred to as "first controlled variable output") is calculated by the first controlled variable output calculation block (first controlled variable output calculation means) 72. And, a request value of controlled variable output for suppressing a strange noise (gear rattle noise) generated, along with a belt vibration of a CVT provided by the automatic transmission 4, in the transfer (hereinafter referred to as "second controlled variable output") is calculated by the second controlled variable output calculation block (second controlled variable output calculation means) 73.

The first controlled variable output is set as a value that can suppress a hypoid gear noise of the rear differential 21 on the basis of a detected value 66 of a lateral acceleration detected by a lateral acceleration sensor (lateral G sensor) or an estimated value (calculated value) 67 of an estimated (calculated) lateral acceleration. Specifically, if the lateral acceleration of the vehicle is equal to or lower than a predetermined value at which the vehicle can be judged to be not turning (if the hypoid gear noise needs to be suppressed), a control for suppressing the hypoid gear noise is performed to lower a controlled variable output to the hydraulic clutch 10 with respect to a basic distribution controlled variable. Further, a second controlled variable output is set, on the basis of an estimated (calculated) drive power 68 and a vehicle speed 69 depending on wheel speeds detected by the wheel speed sensors S1-S4, as a value at which a gear rattle noise of the transfer along with a belt vibration of the CVT can be suppressed. Specifically, for a range in which a gear rattle noise of the transfer might occur along with a belt vibration of the CVT, a control is performed to increase a controlled variable output to the hydraulic clutch 10 for the first controlled variable output.

Then, in a high-select member (first controlled variable output selecting means) 74, the first controlled variable output and the second controlled variable output are compared, of which a larger is selected. In selection using this high-select member 74, while a control is performed to lower a controlled variable output to the hydraulic clutch 10 for suppressing a hypoid gear noise, a control is performed to increase a controlled variable output to the hydraulic clutch 10 for a range in which a gear rattle noise of the transfer might occur along with a belt vibration of the CVT. A range in which a control to lower a controlled variable output to the hydraulic clutch 10 with respect to a basic distribution controlled variable (a controlled variable in the range A1 on the map of FIG. 8) is performed for suppressing a hypoid gear noise here corresponds to the range covering A2 to A4 on the map of FIG. 8. A range in which a control to increase a controlled variable output to hydraulic clutch 10 with respect to a first controlled variable output (a controlled variable in the range A2) is performed for suppressing a gear rattle noise of the transfer along with a belt vibration of the CVT corresponds to the range A4 on the map of FIG. 8. In addition, the range A3 on the map of FIG. 8 is a transition range between the range A2 and the range A4. In this range A3, from the viewpoint of vehicle behavior, a control is performed using a controlled variable between the range A2 and the range A4.

Further, in a low-select member (second controlled variable output selecting means) 75, a controlled variable output selected in the high-select member 74 is compared to a basic distribution of a controlled variable output calculated in the basic distribution calculation block 71, whereby a request torque of a smaller one is selected. In selection using the low-select member 75, a control controlled variable output can be restrained to a value that satisfies two different requests of suppressing a hypoid gear noise and suppressing a gear rattle noise of the transfer along with a belt vibration of the CVT. Based on a final controlled variable output calculated in this way, a command value for the controlled variable with respect to the hydraulic clutch 10 is output.

A drive power distribution device, such as one of the present embodiment, in the four-wheel-drive vehicle including the automatic transmission 4 structured by the CVT has a problem that a gear rattle noise of the transfer is likely to occur due to a belt vibration of the CVT. An effective countermeasure against such a gear rattle noise is to raise a controlled variable output of the front differential 5 for suppressing a vibration. The drive power distribution device has another problem that an increase in load of the hypoid gear of the rear differential 21 causes to generate an operation noise of the hypoid gear. An effective countermeasure against such an operation noise is effective to lower a controlled variable output of the rear differential 21 for suppressing a vibration. In a control of this embodiment, the above-described calculation process of controlled variable output is employed to establish the requests for these two different controlled variable outputs. Such process makes an operation noise generated from the front differential 5 or the rear differential 21 less recognizable to a passenger of the vehicle while maintaining driving performance of the vehicle.

For suppressing a hypoid gear noise of the rear differential 21, a control is preformed to lower a controlled variable output in the range (range A2 of FIG. 8) in which a gear noise may occur. Also here, for calculation of a controlled variable output by the first controlled variable output calculation block 72, low-select values of a detected value 66 from the lateral acceleration sensor S7 and an estimated value 67 of an estimated lateral acceleration estimated from a vehicle speed detected by the vehicle speed sensor S8 and a steering angle detected by the steering angle sensor S5 are used. Due to this, even if the lateral acceleration sensor S7 fails to operate properly by any possibility, a controlled variable output for suppressing a hypoid gear noise of the rear differential 21 can be set on the basis of an estimated lateral acceleration.

In a control for suppressing a gear rattle noise of the transfer, a control is performed to raise a controlled variable output of the transfer in the range in which the gear rattle noise of the transfer may occur (range A4 of FIG. 8) due to a lowered controlled variable output. This range (A4) is covered by the range in which a controlled variable output is lowered (range A2 of FIG. 8) to suppress a hypoid gear noise. In the range A4 in which this control is performed, as shown on the map of FIG. 8, a controlled variable output is a relatively high drive power and the vehicle is running at a low to middle speed.

In addition, the above-described control for suppressing a hypoid gear noise and a gear rattle noise of the transfer is performed only when the vehicle is judged to be not turning. Therefore, when the vehicle is judged to be turning, in order to suppress a fluctuation of drive power of the vehicle, no hydraulic control of the hydraulic clutch 10 is performed on the basis of a controlled variable output selected in the high-select member 74 and the low-select member 75 shown in FIG. 7, and accordingly a basic distribution of a controlled variable output calculated in the basic distribution calculation block 71 is output as a command value of a final controlled variable.

Figure 9:
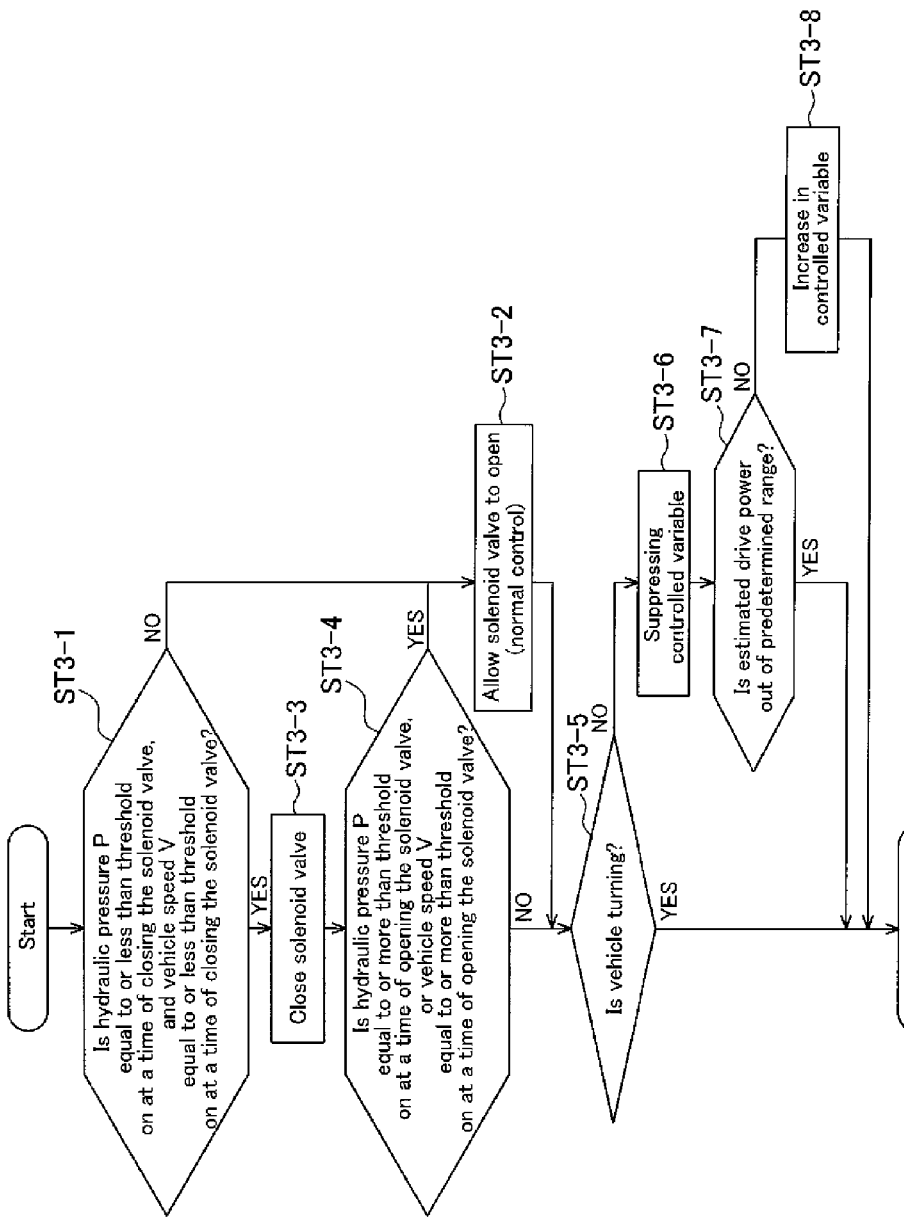
FIG. 9 is a flow chart illustrating a process of a control in a drive power distribution device of the present embodiment.

FIG. 9 is a flow chart illustrating a process of control in the drive power distribution device of the present embodiment. In a control in the drive power distribution device of this embodiment, first, a step judges whether a hydraulic pressure P detected by the hydraulic pressure sensor 45 is equal to or less than a threshold at a time of closing the solenoid valve (threshold hydraulic pressure P1) and whether a vehicle speed V corresponding to a wheel speed detected by the wheel speed sensor S1-S4 is equal to or less than a threshold at a time of closing the solenoid valve (threshold vehicle speed V1) (Step ST3-1). As a result thereof, if the detected hydraulic pressure P is not equal to or less than the threshold at a time of closing the solenoid valve (threshold P1), or if the detected vehicle speed V is not equal or less than the threshold on the closing side (threshold V1) (NO), a step allows the solenoid valve 43 to open as a partial process of a normal opening and closing control of the solenoid valve 43 in a drive power distribution control using the hydraulic clutch 10 (Step ST3-2). On the other hand, if the detected hydraulic pressure is equal to or less than the threshold at a time of closing the solenoid valve (threshold P1), and if the detected vehicle speed V is equal to or less than the threshold of the closing side (threshold V1) (YES), the solenoid valve 43 is closed (Step ST3-3).

Afterwards, a step judges whether the detected hydraulic pressure P is equal to or more than a threshold on the opening side, or whether the vehicle speed V detected by the vehicle speed sensor S8 is equal to or more than a threshold at a time of opening the solenoid valve (Step ST3-4). As a result thereof, if the detected hydraulic pressure P is equal to or more than the threshold of the opening side, or if the detected vehicle speed V is equal to or more than the threshold at a time of opening the solenoid valve (threshold V1) (YES), a step allows the solenoid valve 43 to open as the partial process of the normal opening and closing control of the solenoid valve 43 in the drive power distribution control using the hydraulic clutch 10 (Step ST3-2). On the other hand, if the detected hydraulic pressure is not equal to or more than the threshold at a time of opening the solenoid valve, and if the detected vehicle speed V is not equal to or more than the threshold on the opening side (NO), a step judges whether the vehicle is turning (Step ST3-5). Whether the vehicle is turning is judged based on whether a value detected from the lateral acceleration sensor S7 or an estimated value of a lateral acceleration is equal to or less than a predetermined value. As a result thereof, if the vehicle is turning (YES), the process is terminated without proceeding to a next step. On the other hand, if the vehicle is not turning (NO), a step performs a control to lower a controlled variable output to the hydraulic clutch 10 for suppressing a hypoid gear noise of the rear differential 21 (controlled variable suppression) (Step ST3-6). Afterwards, a step judges whether an estimated drive power of the vehicle is out of a predetermined range (Step ST3-7). The predetermined range here corresponds to a range of estimated drive power in which a gear rattle noise of the transfer needs to be suppressed. As a result thereof, if the estimated drive power is out of the predetermined scope (YES), the process is terminated without proceeding to a next step. And, if the estimated drive power is not out of the predetermined scope (NO), a step performs a control to increase a controlled variable output to the hydraulic clutch 10 for suppressing a gear rattle noise of the transfer along with a belt vibration of the CVT (controlled variable increase) (Step ST3-8). It should be noted that the step using the first controlled variable output calculation block 72 in the block diagram of FIG. 7 corresponds to the Step S3-6 in the flow chart of FIG. 9; the step using the high-select member 74 in the block diagram of FIG. 7 corresponds to the Step S3-7 in the flow chart of FIG. 9; and the step using the low-select member 75 in the block diagram of FIG. 7 corresponds to the Step S3-8 in the flow chart of FIG. 9.

As described above, in the drive distribution device of this embodiment that controls distribution of drive power based on a hydraulic pressure of hydraulic fluid sealed in the oil passage 49 communicating to the piston chamber 15 of the hydraulic clutch 10, a control to close the solenoid valve 43, depending on a hydraulic pressure and a vehicle speed, that controls discharge of hydraulic fluid supplied to the hydraulic clutch 10 can prevent synchronization between an accelerator control by the driver and an operation to close the solenoid valve 43. This can make an operation noise of the on-off valve less recognizable to a driver and a passenger of the vehicle, prevent giving an improper impression to the driver and the passenger as if a malfunction has occurred to any device of the vehicle.

In addition, the drive power distribution device of this embodiment is configured to close the solenoid valve 43 when the hydraulic pressure P becomes equal to or less than the predetermined threshold hydraulic pressure P1 and the predetermined vehicle speed V becomes equal to or less than the threshold vehicle speed V1, thereby preventing closing the solenoid valve 43 at a timing when the vehicle starts moving from the stopped state. On account of this, in a range in which a noise such as a wind noise and a road noise along with driving of the vehicle is small, no operation noise of the solenoid valve 43 occurs. This can make an operation noise of the solenoid valve less recognizable to the passenger of the vehicle.

Further, the drive power distribution device of this embodiment is configured to close the solenoid valve 43 when the hydraulic pressure P becomes equal to or less than the predetermined threshold hydraulic pressure P1 and the vehicle speed V becomes equal to or less than the predetermined threshold vehicle speed V1, thereby enabling to close the solenoid valve 43 before distribution of drive power using the hydraulic clutch 10 is required (prior closing). Therefore, responsiveness of drive power distribution along with the drive power distribution using the hydraulic clutch 10 can be improved.

Further, in the drive power distribution device of this embodiment, the solenoid valve 43 is a normally open-type electromagnetic valve. According to this configuration, while an operation noise occurs when the solenoid valve 43 is closed, an operation noise can be prevented from occurring when the solenoid valve 43 is opened.

Further, in the drive power distribution device of this embodiment, the above-described threshold vehicle speed V1 for closing the solenoid valve 43 is set so that at a vehicle speed higher than this threshold vehicle speed V1, an operation noise generated when the solenoid valve 43 is closed is unrecognizable to the passenger of the vehicle due to a noise generated from driving of the vehicle. Due to this, a noise generated along with driving of the vehicle can deafen an operation noise generated when the solenoid valve 43 is closed. Accordingly, the operation noise of the solenoid valve 43 can be made less recognizable to the passenger of the vehicle.

Further in the drive power distribution device of this embodiment, when a target hydraulic pressure of the hydraulic clutch 10 is lower than a target oil pressure calculated last time by a predetermined value, a control is performed, by opening the solenoid valve 43 to open the oil passage 49, to progressively change oil pressure supplied to the hydraulic clutch 10 depending on calculated drive power. Such control can improve the responsiveness of drive power distribution.

Further, the drive power distribution device of this embodiment includes the high-select member (first controlled variable output selecting means) 74 that compares between a first controlled variable output set on the basis of a lateral acceleration of the vehicle detected by the lateral acceleration sensor S7 and a second controlled variable output set on the basis of a calculated drive power and a detected vehicle speed to select a larger one of the controlled variable outputs. The drive power distribution device of this embodiment also includes the low-select member (second controlled variable output calculation means) 75 that compares between a controlled variable output selected by the high-select member 74 and a basic distribution of a controlled variable output calculated by the distribution calculation block 71 (normal controlled variable output) to select a larger one of the controlled variable outputs. And, when a vehicle speed V of the vehicle is higher than the threshold vehicle speed V1, a control hydraulic pressure of the hydraulic clutch 10 is calculated on the basis of a controlled variable output selected in the above-described low-select member 75.

According to this configuration, a strange noise, except an operation noise generated when the solenoid valve 43 is closed, specifically such as a hypoid gear noise of the rear differential 21 and a gear rattle noise of the transfer along with a belt vibration of the CVT can be suppressed effectively.

Meanwhile, if the vehicle is judged to be turning, no hydraulic control of the hydraulic clutch 10 is performed on the basis of the controlled variable output selected by the above-described high-select member 74 and the above-described low-select member 75. In this way, when the vehicle is judged to be turning, no hydraulic control of the hydraulic clutch 10 is performed on the basis of the controlled variable output selected in the low-select member 75, thereby enabling to suppress a fluctuation of drive power when the vehicle is turning. Meanwhile, when the vehicle is turning, a noise such as a road noise along with a drive of the vehicle is relatively large. Due to this, even if a control of the hydraulic clutch 10 using a hydraulic pressure selected by the high-select member and the low-select member 75, a passenger is less concerned about a strange noise such as a hypoid gear noise of the rear differential 21 and a gear rattle noise of the transfer along with a belt vibration of the CVT.

While the embodiment of the invention has been described, it is to be understood that the invention is not limited to the foregoing embodiments. Rather, the invention can be modified to incorporate any number of variations or alterations within the scope of claims and the scope of technical concept described in the specification and the drawings thereof. For example, in the above-described embodiment, the oil pressure sensor 45 is described as an example of a means for detecting a hydraulic pressure of the oil passage 49 and the piston chamber 15, and the wheel speed sensor S1-S4 is described as an example of a means for detecting a vehicle speed of the vehicle. Still, a means for detecting hydraulic pressure and vehicle speed is not limited respectively to the above-described hydraulic pressure sensor 45 and the above-described wheel speed sensor S1-S4. Therefore, for example, instead of the four-wheel speeds detected by the wheel speed sensors S1-S4, a vehicle speed detected by the vehicle speed sensor S8 may be used. In addition, an estimated value (calculated value) instead of a detected value may be used as a hydraulic pressure and a vehicle speed.

The invention claimed is:

1. A drive power distribution device comprising:
a hydraulic clutch for distributing drive power from a driving source of a vehicle to a main driving wheel and an auxiliary driving wheel;
an oil pump driven with a motor for supplying hydraulic fluid to a piston chamber of the hydraulic clutch;
a hydraulic fluid sealing valve for sealing hydraulic fluid in an oil passage communicating to the piston chamber from the oil pump;
an on-off valve that contains the oil passage between the hydraulic fluid sealing valve and the piston chamber;
an electronic control unit configured to
control driving of the oil pump using the motor and opening and closing of the on-off valve so as to supply a desired hydraulic pressure to the piston chamber, and
calculate drive power of the vehicle;
a hydraulic pressure sensor configured to detect hydraulic pressure of the oil passage; and
a vehicle speed sensor configured to detect vehicle speed of the vehicle, wherein the drive power distribution device configured so that by closing the on-off valve and driving the oil pump, a hydraulic pressure detected using the hydraulic pressure sensor has reached a target hydraulic pressure corresponding to drive power calculated using the electronic control unit, and thereafter fastening power of the hydraulic clutch is maintained at an oil pressure of hydraulic fluid sealed in the oil passage until the on-off valve is opened, and wherein the electronic control unit is configured to close the on-off valve at a hydraulic pressure detected using the hydraulic pressure sensor being equal to or less than a predetermined threshold hydraulic pressure and at a vehicle speed detected using the vehicle speed detected using the vehicle speed sensor being equal to or less than a predetermined threshold vehicle speed.

2. The drive power distribution device according to claim 1, wherein the on-off valve is a normally open-type electromagnetic valve so that the valve is opened without power supply.

3. The drive power distribution device according to claim 1, wherein the threshold vehicle speed is judged to be unrecognizable to a passenger of the vehicle due to a noise generated due to driving of the vehicle at a vehicle speed higher than the threshold vehicle speed.

4. The drive power distribution device according to claim 1, wherein at a target hydraulic pressure of the hydraulic clutch lower than a target oil pressure calculated last time by a predetermined value, the electronic control unit is configured to perform a control of opening the solenoid valve to open the oil passage and accordingly progressively changing oil pressure supplied to the hydraulic clutch depending on drive power calculated using the electronic control unit.

5. The drive power distribution device according to claim 1 comprising a lateral speed sensor configured to calculate lateral speed of the vehicle,
wherein the electronic control unit is configured to:
set a first controlled variable output contributing to reduction of one operation noise generated from a driving system of the vehicle on the basis of a lateral acceleration calculated using a lateral acceleration sensor;
set a second controlled variable output contributing to reduction of another operation noise generated from the driving system of the vehicle on the basis of the drive power calculated using the electronic control unit and the vehicle speed detected using the vehicle speed sensor;
compare between the first controlled variable output and the second controlled variable output to select a larger one thereof; and
compare between the controlled variable output selected using the electronic control unit and a basic controlled variable output set on the basis of the controlled variable output calculated using the electronic control unit to select a smaller one thereof,
the drive power distribution device performing a hydraulic pressure control on the basis of the controlled variables selected using the electronic control unit.

6. The drive power distribution device according to claim 5, wherein the electronic control unit is configured to perform no hydraulic control on the basis of the controlled variable outputs selected using the electronic control unit if the vehicle is judged to be turning.

7. The drive power distribution device according to claim 2, wherein the threshold vehicle speed is judged to be unrecognizable to a passenger of the vehicle due to a noise generated due to driving of the vehicle at a vehicle speed higher than the threshold vehicle speed.

8. The drive power distribution device according to claim 2, wherein at a target hydraulic pressure of the hydraulic clutch lower than a target oil pressure calculated last time by a predetermined value, the electronic control unit is configured to perform a control of opening the solenoid valve to open the oil passage and accordingly progressively changing oil pressure supplied to the hydraulic clutch depending on drive power calculated using the electronic control unit.

9. The drive power distribution device according to claim 3, wherein at a target hydraulic pressure of the hydraulic clutch lower than a target oil pressure calculated last time by a predetermined value, the electronic control unit is configured to perform a control of opening the solenoid valve to open the oil passage and accordingly progressively changing oil pressure supplied to the hydraulic clutch depending on drive power calculated using the electronic control unit.

10. The drive power distribution device according to claim 7, wherein at a target hydraulic pressure of the hydraulic clutch lower than a target oil pressure calculated last time by a predetermined value, the electronic control unit is configured to perform a control of opening the solenoid valve to open the oil passage and accordingly progressively changing oil pressure supplied to the hydraulic clutch depending on drive power calculated using the electronic control unit.

11. The drive power distribution device according to claim 2 comprising a lateral speed sensor configured to calculate lateral speed of the vehicle,
wherein the electronic control unit is configured to:
set a first controlled variable output contributing to reduction of one operation noise generated from a driving system of the vehicle on the basis of a lateral acceleration calculated using a lateral acceleration sensor;
set a second controlled variable output contributing to reduction of another operation noise generated from the driving system of the vehicle on the basis of the drive power calculated using the electronic control unit and the vehicle speed detected using the vehicle speed sensor;
compare between the first controlled variable output and the second controlled variable output to select a larger one thereof; and
compare between the controlled variable output selected using the electronic control unit and a basic controlled variable output set on the basis of the controlled variable output calculated using the electronic control unit to select a smaller one thereof,
the drive power distribution device performing a hydraulic pressure control on the basis of the controlled variables selected using the electronic control unit.

12. The drive power distribution device according to claim 3 comprising a lateral speed sensor configured to calculate lateral speed of the vehicle,
wherein the electronic control unit configured to:
set a first controlled variable output contributing to reduction of one operation noise generated from a driving system of the vehicle on the basis of a lateral acceleration calculated using a lateral acceleration sensor;
set a second controlled variable output contributing to reduction of another operation noise generated from the driving system of the vehicle on the basis of the drive power calculated using the electronic control unit and the vehicle speed detected using the vehicle speed sensor;

compare between the first controlled variable output and the second controlled variable output to select a larger one thereof; and compare between the controlled variable output selected using the electronic control unit and a basic controlled variable output set on the basis of the controlled variable output calculated using the electronic control unit to select a smaller one thereof, the drive power distribution device performing a hydraulic pressure control on the basis of the controlled variables selected using the electronic control unit.

13. The drive power distribution device according to claim 7 comprising a lateral speed sensor configured to calculate lateral speed of the vehicle, wherein the electronic control unit is configured to:
set a first controlled variable output contributing to reduction of one operation noise generated from a driving system of the vehicle on the basis of a lateral acceleration calculated using a lateral acceleration sensor;

set a second controlled variable output contributing to reduction of another operation noise generated from the driving system of the vehicle on the basis of the drive power calculated using the electronic control unit and the vehicle speed detected using the vehicle speed sensor;

compare between the first controlled variable output and the second controlled variable output to select a larger one thereof; and compare between the controlled variable output selected using the electronic control unit and a basic controlled variable output set on the basis of the controlled variable output calculated using the electronic control unit to select a smaller one thereof, the drive power distribution device performing a hydraulic pressure control on the basis of the controlled variables selected using the electronic control unit.

14. The drive power distribution device according to claim 8 comprising a lateral speed sensor configured to calculate lateral speed of the vehicle, wherein the electronic control unit is configured to:
set a first controlled variable output contributing to reduction of one operation noise generated from a driving system of the vehicle on the basis of a lateral acceleration calculated using a lateral acceleration sensor;

set a second controlled variable output contributing to reduction of another operation noise generated from the driving system of the vehicle on the basis of the drive power calculated using the electronic control unit and the vehicle speed detected using the vehicle speed sensor;

compare between the first controlled variable output and the second controlled variable output to select a larger one thereof; and compare between the controlled variable output selected using the electronic control unit and a basic controlled variable output set on the basis of the controlled variable output calculated using the electronic control unit to select a smaller one thereof, the drive power distribution device performing a hydraulic pressure control on the basis of the controlled variables selected using the electronic control unit.

15. The drive power distribution device according to claim 9 comprising a lateral speed sensor configured to calculate lateral speed of the vehicle, wherein the electronic control unit is configured to:
set a first controlled variable output contributing to reduction of one operation noise generated from a driving system of the vehicle on the basis of a lateral acceleration calculated using a lateral acceleration sensor;

set a second controlled variable output contributing to reduction of another operation noise generated from the driving system of the vehicle on the basis of the drive power calculated using the electronic control unit and the vehicle speed detected using the vehicle speed sensor;

compare between the first controlled variable output and the second controlled variable output to select a larger one thereof; and compare between the controlled variable output selected using the electronic control unit and a basic controlled variable output set on the basis of the controlled variable output calculated using the electronic control unit to select a smaller one thereof, the drive power distribution device performing a hydraulic pressure control on the basis of the controlled variables selected using the electronic control unit.

16. The drive power distribution device according to claim 10 comprising a lateral speed sensor configured to calculate lateral speed of the vehicle, wherein the electronic control unit is configured to:
set a first controlled variable output contributing to reduction of one operation noise generated from a driving system of the vehicle on the basis of a lateral acceleration calculated using a lateral acceleration sensor;

set a second controlled variable output contributing to reduction of another operation noise generated from the driving system of the vehicle on the basis of the drive power calculated using the electronic control unit and the vehicle speed detected using the vehicle speed sensor;

compare between the first controlled variable output and the second controlled variable output to select a larger one thereof; and compare between the controlled variable output selected using the electronic control unit and a basic controlled variable output set on the basis of the controlled variable output calculated using the electronic control unit to select a smaller one thereof, the drive power distribution device performing a hydraulic pressure control on the basis of the controlled variables selected using the electronic control unit.

17. The drive power distribution device according to claim 11, wherein the electronic control unit is configured to perform no hydraulic control on the basis of the controlled variable outputs selected using the electronic control unit if the vehicle is judged to be turning.

18. The drive power distribution device according to claim 12, wherein the electronic control unit is configured to perform no hydraulic control on the basis of the controlled variable outputs selected using the electronic control unit if the vehicle is judged to be turning.

19. The drive power distribution device according to claim 13, wherein the electronic control unit is configured to perform no hydraulic control on the basis of the controlled variable outputs selected using the electronic control unit if the vehicle is judged to be turning.

20. The drive power distribution device according to claim 14, wherein the electronic control unit is configured to perform no hydraulic control on the basis of the controlled variable outputs selected using the electronic control unit if the vehicle is judged to be turning.

\* \* \* \* \*